United States Patent
Jeong et al.

(10) Patent No.: US 7,850,902 B2
(45) Date of Patent: Dec. 14, 2010

(54) APPARATUS FOR MANUFACTURING MOLTEN IRONS

(75) Inventors: Sun-Kwang Jeong, Pohang (KR); Myoung-Kyun Shin, Pohang (KR); Min-Young Cho, Pohang (KR)

(73) Assignees: POSCO, Pohang (KR); Siemens VAI Metals Technologies GmbH & Co., Linz (AT)

( * ) Notice: Subject to any disclaimer, the term of this patent is extended or adjusted under 35 U.S.C. 154(b) by 191 days.

(21) Appl. No.: 12/158,886

(22) PCT Filed: Dec. 26, 2006

(86) PCT No.: PCT/KR2006/005700

§ 371 (c)(1),
(2), (4) Date: Jun. 23, 2008

(87) PCT Pub. No.: WO2007/075023

PCT Pub. Date: Jul. 5, 2007

(65) Prior Publication Data

US 2008/0302212 A1    Dec. 11, 2008

(30) Foreign Application Priority Data

Dec. 26, 2005    (KR) .................. 10-2005-0130122

(51) Int. Cl.
*C21B 13/02*    (2006.01)
(52) U.S. Cl. ..................................... 266/172; 266/182
(58) Field of Classification Search ............ 266/172, 266/182
See application file for complete search history.

(56) References Cited

U.S. PATENT DOCUMENTS 4,806,158 A    2/1989    Hirsch et al.

(Continued)

FOREIGN PATENT DOCUMENTS

CA    2511731 A1    7/2004

(Continued)

OTHER PUBLICATIONS

Abstract, RU 2263715, published Nov. 10, 2005, Inventor: Jokhann Tsirngast, "Metal Melting Method and Apparatus" corresponds to U.S. Patent No. 6,645,269 (1 p.).

*Primary Examiner*—George Wyszomierski
*Assistant Examiner*—Tima M McGuthry-Banks
(74) *Attorney, Agent, or Firm*—The Webb Law Firm

(57) ABSTRACT

A method for manufacturing molten iron that improves charging and discharge of the fine iron ore, and an apparatus for manufacturing molten iron using the same. The apparatus for manufacturing molten iron includes i) at least one fluidized-bed reduction reactor that reduces fine iron ore and converts the fine iron ore into reduced iron, ii) a fine iron ore charging bin that supplies the fine iron ore to the fluidized-bed reduction reactor, iii) a fine iron ore charging line that directly connects the fine iron ore charging bin to each of the fluidized-bed reduction reactors, and directly charges the fine iron ore into each of the fluidized-bed reduction reactor, iv) a melter-gasifier into which lumped carbonaceous materials and the reduced iron are charged and oxygen is injected, the melter-gasifier manufacturing molten iron, and v) a reducing gas supply line that supplies a reducing gas discharged from the melter-gasifier to the fluidized-bed reduction reactor.

12 Claims, 6 Drawing Sheets

U.S. PATENT DOCUMENTS

| | | |
|---|---|---|
| 5,514,203 A | 5/1996 | Grunbacher et al. |
| 5,584,910 A | 12/1996 | Kepplinger et al. |
| 5,785,733 A | 7/1998 | Lee et al. |
| 5,897,829 A | 4/1999 | Kim et al. |
| 5,961,690 A | 10/1999 | Kepplinger et al. |
| 6,086,653 A | 7/2000 | Joo et al. |
| 6,235,079 B1 | 5/2001 | Choi et al. |
| 6,585,798 B2 | 7/2003 | Choi et al. |
| 6,645,269 B2 | 11/2003 | Zirngast |
| 7,588,625 B2 * | 9/2009 | Nam et al. .................... 75/446 |
| 7,713,329 B2 | 5/2010 | Shin et al. |
| 2002/0166412 A1 * | 11/2002 | Choi et al. .................... 75/444 |
| 2006/0119023 A1 | 6/2006 | Shin et al. |

FOREIGN PATENT DOCUMENTS

| | | |
|---|---|---|
| KR | 20000009737 A | 2/2000 |
| RU | 2195501 C1 | 12/2002 |
| WO | 0146478 A2 | 6/2001 |
| WO | 2004057038 A1 | 7/2004 |

* cited by examiner

---- moving path of the reducing gas
—— moving path of the fine iron ores

---- moving path of the reducing gas
—— moving path of the fine iron ores

----- moving path of the reducing gas
——— moving path of the fine iron ores

----- moving path of the reducing gas
—— moving path of the fine iron ores

APPARATUS FOR MANUFACTURING MOLTEN IRONS

BACKGROUND OF THE INVENTION

1. Technical Field

The present invention relates a method for manufacturing molten iron and an apparatus for manufacturing molten iron that are capable of stably charging and discharging fine iron ore quickly during an emergency situation.

2. Background Art

The iron and steel industry is a core industry that supplies the basic materials needed in construction and in the manufacture of automobiles, ships, home appliances, and many of the other products we use. It is also an industry with one of the longest histories that has progressed together with humanity. In an iron foundry, which plays a pivotal roll in the iron and steel industry, after molten iron, which is pig iron in a molten state, is produced by using iron ore and coal as raw materials, steel is produced from the molten iron and then supplied to customers.

At present, approximately 60% of the world's iron production is realized by using the blast furnace process developed from the 14th century. In the blast furnace process, coke produced by using bituminous coal and iron ore that have undergone a sintering process are charged into a blast furnace, and hot gas is supplied to the blast furnace to reduce the iron ore to iron, to thereby manufacture molten iron. However, in the blast furnace process, there are problems in that accessory equipment is necessary to manufacture coke and sintered ore, and environmental pollution is very severe due to the accessory equipment.

In order to solve the above problems of the blast furnace process, a smelting reduction process has been developed and researched by many countries. In the smelting reduction process, molten iron is manufactured in a melter-gasifier by directly using raw coal as a fuel and a reducing agent and iron ore as an iron source. Here, oxygen is injected through a plurality of tuyeres installed in an outer wall of the melter-gasifier, a coal-packed bed in the melter-gasifier is burned, and then molten iron is manufactured. The oxygen is converted into a hot reducing gas and is transferred to a fluidized-bed reduction reactor. Then, the hot reducing gas reduces fine iron ore and is discharged outside.

The fluidized-bed reduction reactor reduces fine iron ore with a grain size that is equal to or less than 8 mm. The fine iron is fluidized in a reducing gas flow and then reduced in the fluidized-bed reduction reactor. That is, the fluidized-bed reduction reactor reduces fine iron ore by interacting a reducing gas as a gas with fine iron ore as a solid. The fluidized-bed reduction reactor includes a cyclone and a distribution plate. Nozzles are regularly arranged in the distribution plate. Here, the cyclone includes a cone portion located in an upper portion thereof and a dipleg portion located in a lower portion thereof. A reducing gas is ejected toward the upper portion while entering from the lower portion of the fluidized-bed reduction reactor and passing through the distribution plate. Since a plurality of distribution nozzles are installed on the distribution plate, the reducing gas can be ejected with a high speed toward the upper portion of the distribution plate. The cone portion of the cyclone located in an upper portion of the fluidized-bed reduction reactor collects fine iron ore and re-transfers it to the lower portion of the fluidized-bed reduction reactor through the dipleg portion.

The reducing gas passing through the distribution plate uniformly flows over an entire area of the fluidized-bed reduction reactor. However, when the fine iron ore is charged into the fluidized-bed reduction reactor in an early operating time, the fluidized bed is not formed up to the height of the lower end of the dipleg portion. In the dipleg portion, the reducing gas flows at a high speed toward an upper portion thereof through an inside thereof. Therefore, when the dipleg portion is not sealed, the fine iron and the reducing gas flow back to rise toward the cone portion through the dipleg portion.

The fine iron scattered in the upper portion of the fluidized-bed reduction reactor is collected in the cone portion of the cyclone and re-circulated toward the lower portion of the fluidized-bed reduction reactor. Therefore, backflowing fine iron and scattered fine ore collide with each other and then the dipleg portion is blocked. Furthermore, there is a phenomenon in which the dipleg portion is blocked due to detachment of a coating layer inside the cyclone. As described above, since a large load is applied to another cyclone if the dipleg portion is blocked and the cyclone does not operate well, a large amount of fine iron is discharged outside of the fluidized-bed reduction reactor. In this phenomenon, although backflow of the fine iron toward the dipleg portion is largely reduced if the fluidized bed is formed up to the dipleg portion as the fine iron ore is discharged and then the dipleg portion is sealed by the fluidized bed, there is a problem in that initial operation of the fluidized-bed reduction reactor is unstable.

Meanwhile, if a flow of the fine iron ore between the fluidized-bed reduction reactors is not normal due to an unstable operation of the fluidized-bed reduction reactors, the height of the fluidized bed rises to equal to or above the discharging passage of the fine ore. The pressure of a quencher is controlled to be lower than that of the fluidized bed by using another discharging passage to lower the height of the fluidized bed. The height of the fluidized bed can be lowered by discharging fine ore into the quencher by force by using the pressure difference. However, as a flow of the reducing gas of the fluidized bed is concentrated on another discharging passage in a moment by the enforced discharge of the fine ore due to a pressure difference, the fluidized bed is impacted. Accordingly, fine ore drops toward a lower portion of the distribution plate, and furthermore a stagnating layer is formed in and near the other discharging passage and then there is a problem in that non-fluidizing area, which is fatal to an operation of the fluidized-bed reduction reactor, is formed.

The present invention is contrived to provide a method for manufacturing molten iron that is capable of stably charging and discharging fine iron ore quickly during an emergency situation.

In addition, the present invention is contrived to provide an apparatus for manufacturing molten iron that is capable of stably charging and discharging fine iron ore quickly during an emergency situation.

SUMMARY OF THE INVENTION

An apparatus for manufacturing molten iron according to an embodiment of the present invention includes i) at least one fluidized-bed reduction reactor that reduces fine iron ore and converts the fine iron ore into reduced iron, ii) a fine iron ore charging bin that supplies the fine iron ore to the fluidized-bed reduction reactor, iii) a fine iron ore charging line that directly connects the fine iron ore charging bin to each of the fluidized-bed reduction reactors, and directly charges the fine iron ore into each of the fluidized-bed reduction reactors, iv) a melter-gasifier into which lumped carbonaceous materials and the reduced iron are charged and oxygen is injected, the melter-gasifier manufacturing molten iron, and v) a reducing gas supply line that supplies a reducing gas discharged from the melter-gasifier to the fluidized-bed reduction reactor.

The fine iron ore charging line may include i) a sub-fine iron ore charging line that is connected to the fine iron ore charging bin, and ii) a branch fine iron ore charging line that is branched from the sub-fine iron ore charging line and is connected to each of the fluidized-bed reduction reactors. An apparatus for manufacturing molten iron according to an embodiment of the present invention may further include a quencher that is connected to the fine iron ore charging bin through the sub-fine iron ore charging line.

A plurality of junctions may be formed where the sub-fine iron ore charging line meets the branch fine iron ore charging line, and a charging valve is installed between neighboring junctions, between the fine iron ore charging bin and the junction that is most adjacent thereto, and between the quencher and the junction that is most adjacent thereto. A charging valve may be installed in the branch fine iron ore charging line.

An apparatus for manufacturing molten iron according to an embodiment of the present invention may further include a main fine iron ore charging line that connects the fine iron ore charging bin to the fluidized-bed reduction reactor that is most adjacent to the fluidized-bed reduction reactor and connects the neighboring fluidized-bed reduction reactors to each other. The sub-fine iron ore charging line may be connected to the fluidized-bed reduction reactor at a height that is the same as the height where the main fine iron ore charging line is connected to the fluidized-bed reduction reactor. The sub-fine iron ore charging line that is connected to the fluidized-bed reduction reactor may make a predetermined angle with the main fine iron ore charging line where the main fine iron ore charging line is connected to the fluidized-bed reduction reactor. The predetermined angle may be in a range from 30 degrees to 150 degrees.

An apparatus for manufacturing molten iron according to another embodiment of the present invention includes i) at least one fluidized-bed reduction reactor in which a fluidized bed is formed, the fluidized-bed reduction reactor reducing fine iron ore and converting the fine iron ore into reduced iron, ii) a fine iron ore discharging line that connects each of the fluidized-bed reduction reactors at a middle or an upper portion of the fluidized bed and discharges fine iron ore from the fluidized-bed reduction reactor, iii) a melter-gasifier into which lumped carbonaceous materials and the reduced iron are charged and oxygen is injected, the melter-gasifier manufacturing molten iron, and iv) a reducing gas supply line that supplies a reducing gas discharged from the melter-gasifier to the fluidized-bed reduction reactor.

An apparatus for manufacturing molten iron according to another embodiment of the present invention may further include a quencher that is connected to each of the fluidized-bed reduction reactors through the fine iron ore discharging line. An apparatus for manufacturing molten iron according to another embodiment of the present invention may further include another fine iron ore discharging line that is directly installed on the distribution plate in each of the fluidized-bed reduction reactors. The fine iron ore discharging line may be connected to the other fine iron ore discharging line.

An apparatus for manufacturing molten iron according to another embodiment of the present invention may further include a fine iron ore charging line that connects the fluidized-bed reduction reactors to each other and discharges the fine iron ore. The fine iron ore discharging line may be connected to each of the fluidized-bed reduction reactors at a location where the fine iron ore discharging line is higher than a lower end of the dipleg portion of a cyclone installed in each of the fluidized-bed reduction reactor and is lower than the fine iron ore charging line.

An apparatus for manufacturing molten iron according to another embodiment of the present invention includes i) at least one fluidized-bed reduction reactor in which a fluidized bed is formed, the fluidized-bed reduction reactor reducing fine iron ore and converting the fine iron ore into reduced iron, ii) a fine iron ore charging bin that supplies fine iron ore to the fluidized-bed reduction reactor, iii) a fine iron ore charging line that directly connects the charging bin to each of the fluidized-bed reduction reactors, and directly charges the fine iron ore into each of the fluidized-bed reduction reactors, iv) a fine iron ore discharging line that is connected to each of the fluidized-bed reduction reactors at a middle or an upper portion of the fluidized bed and discharges fine iron ore from each of the fluidized-bed reduction reactors, v) a melter-gasifier into which lumped carbonaceous materials and the reduced iron are charged and oxygen is injected, the melter-gasifier manufacturing molten iron, and vi) a reducing gas supply line that supplies a reducing gas discharged from the melter-gasifier to the fluidized-bed reduction reactor.

An apparatus for manufacturing molten iron according to another embodiment of the present invention may further include a quencher that is connected to the fine iron ore charging line and the fine iron ore discharging line.

A method for manufacturing molten iron according to an embodiment of the present invention includes i) directly charging fine iron ore into a fluidized-bed reduction reactor from a fine iron ore charging bin through a fine iron ore charging line that directly connects the fine iron ore charging bin and each of a plurality of the fluidized-bed reduction reactors, ii) converting the fine iron ore into reduced iron while passing the fine iron ore through the at least one fluidized-bed reduction reactor, iii) charging lumped carbonaceous materials and the reduced iron into the melter-gasifier connected to the fluidized-bed reduction reactor, injecting oxygen into the melter-gasifier, and manufacturing molten iron, and iv) supplying a reducing gas discharged from the melter-gasifier to the fluidized-bed reduction reactor.

The fine iron ore may be directly charged into only a predetermined fluidized-bed reduction reactor among the plurality of fluidized-bed reduction reactors in the supplying of the fine iron ore to the fluidized-bed reduction reactor. A method for manufacturing molten iron according to an embodiment of the present invention may further include supplying the fine iron ore to the fluidized-bed reduction reactor from the fine iron ore charging bin through a main fine iron ore charging line. The main fine iron ore charging line may connect the fine iron ore charging bin to the fluidized-bed reduction reactor that is most adjacent to the fine iron ore charging bin, and the main fine iron ore charging line connects neighboring fluidized-bed reduction reactors to each other.

In an apparatus for manufacturing molten iron according to an embodiment of the present invention, since fine iron ore can be charged or discharged quickly, stability of an operation is largely improved. In addition, since a factor that makes operation unstable is removed by suppressing blockage of the cyclone or formation of the stagnating layer, the operation can be stably maintained.

DETAILED DESCRIPTION OF THE INVENTION

Embodiments of the present invention are explained below with reference to FIGS. 1 to 6. The embodiments are merely to illustrate the present invention and the present invention is not limited thereto.

Figure 1:
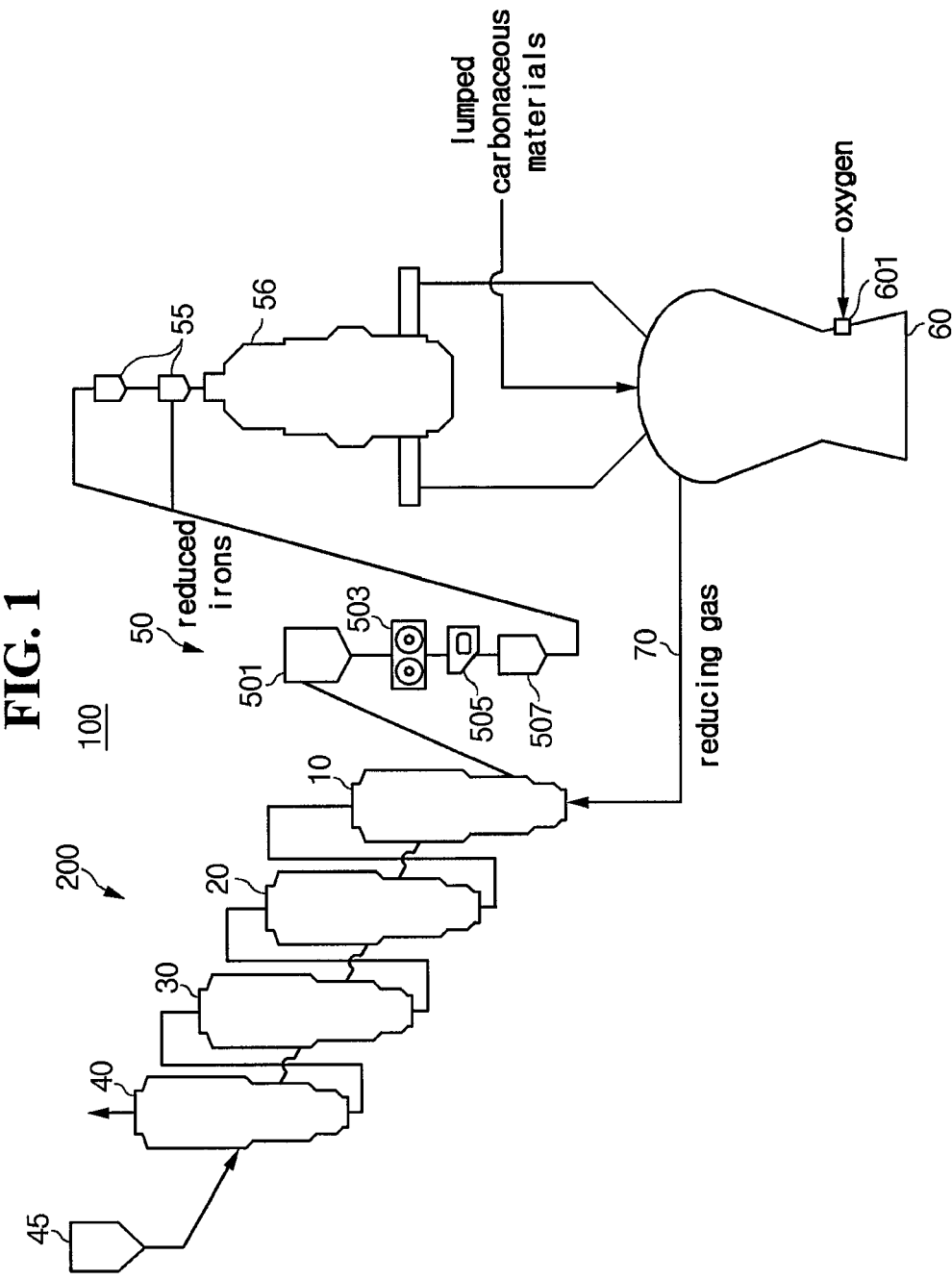
FIG. 1 is a schematic view illustrating an apparatus for manufacturing molten iron according to an embodiment of the present invention.

FIG. 1 illustrates an apparatus for manufacturing molten iron 100 according to an embodiment of the present invention. The apparatus for manufacturing molten iron 100 illustrated in FIG. 1 is merely to illustrate the present invention and the present invention is not limited thereto. Therefore, the apparatus for manufacturing molten iron 100 can be modified in other forms.

The apparatus for manufacturing molten iron 100 includes at least one fluidized-bed reduction reactor 20, a melter-gasifier 60, a reducing gas supply line 70, and an apparatus for manufacturing compacted iron 50. In addition, the apparatus for manufacturing molten iron 100 can include a hot pressure equalizing device 55 for transferring compacted iron manufactured in the apparatus for manufacturing compacted iron 50 to the melter-gasifier 60. The hot pressure equalizing device 55 transfers compacted iron manufactured in the apparatus for manufacturing compacted iron 40 to the melter-gasifier 60. A compacted iron charging bin 56 can temporarily store the compacted iron.

A fine iron ore charging apparatus and a discharging apparatus near the fluidized-bed reduction reactor 200 are omitted for convenience of explanation. They will be explained in detail with reference to FIGS. 3 to 6.

The fluidized-bed reduction reactor 200 includes a first reduction reactor 10, a second reduction reactor 20, a third first reduction reactor 30, and a fourth reduction reactor 40. Although four fluidized-bed reduction reactors 200 sequentially connected to each other are illustrated in FIG. 1, this is merely to illustrate the present invention and the present invention is not limited thereto. Therefore, three fluidized-bed reduction reactors can be used.

As a raw resource, iron ore, for example fine iron ore, is manufactured into molten iron by the apparatus for manufacturing molten iron 100. First, fine iron ore is dried and then restored in the fine ore charging bin 45. Additives can be mixed with the fine iron ore and then the mixture is dried and then used as necessary. The fine iron ore is reduced and heated while passing through the fluidized-bed reduction reactor 200 and is then converted into reduced iron. The fine iron ore is sequentially charged into the fluidized-bed reduction reactors 40, 30, 20, and 10 in which fluidized beds are formed, respectively.

Firstly, the fine iron ore is preheated in the fourth fluidized-bed reduction reactor 40 by the reducing gas. The preheated fine iron ore is charged into the third and second fluidized-bed reduction reactors 30 and 20. Here, the fine iron ore is pre-reduced. The pre-reduced fine iron ore is charged into the first fluidized-bed reduction reactor 10 and then finally reduced and converted into the reduced iron. The reducing gas is supplied to the fluidized-bed reduction reactor 200 through the reducing gas supply line 70 that is connected to the melter-gasifier 60 to manufacture reduced iron. The reduced iron is manufactured into the compacted iron by using the apparatus for manufacturing compacted iron 50. The reduced iron may be directly charged into the melter-gasifier 60 without passing through the apparatus for manufacturing compacted iron 50.

The apparatus for manufacturing compacted iron 50 includes a charging hopper 501, a pair of rollers 503, and a crusher 505. The charging hopper 501 stores fine iron ore that is reduced and plasticized while passing through the fluidized-bed reduction reactor 200. The fine iron ore is charged from the charging hopper 501 to the pair of rollers 503 and then pressed and molded into a strip-shaped form. As described above, the pressed and molded fine ore is crushed in the crusher 505 and then transported to the melter-gasifier 60.

Meanwhile, a coal packed-bed is formed in the melter-gasifier 60. Lumped carbonaceous materials are charged into an upper portion of the melter-gasifier 60. A plurality of tuyeres 601 are installed in an outer wall of the melter-gasifier 60 and then oxygen is injected into the melter-gasifier 60. The coal-packed bed is combusted by the oxygen and then a char bed is formed. The compacted iron manufactured in the apparatus for manufacturing compacted iron 50 is charged into an upper portion of the melter-gasifier 60, passes through the coal-packed bed, and then is melted to be partially reduced. Molten iron can be manufactured by using the above method. A tap (not shown) is installed in a lower portion of the melter-gasifier 60 and then molten iron and slag are discharged outside.

In addition, hot reducing gas containing hydrogen and carbon monoxide is generated from the coal-packed bed formed in the melter-gasifier 60. It is preferable for the upper portion of the melter-gasifier 60 to be dome-shaped to generate the reducing gas. The reducing gas discharged from the melter-gasifier 60 is supplied to the melter-gasifier 200 through the reducing gas supply line 70. Therefore, the fine iron ore can be reduced and plasticized by using the reducing gas.

Figure 2:
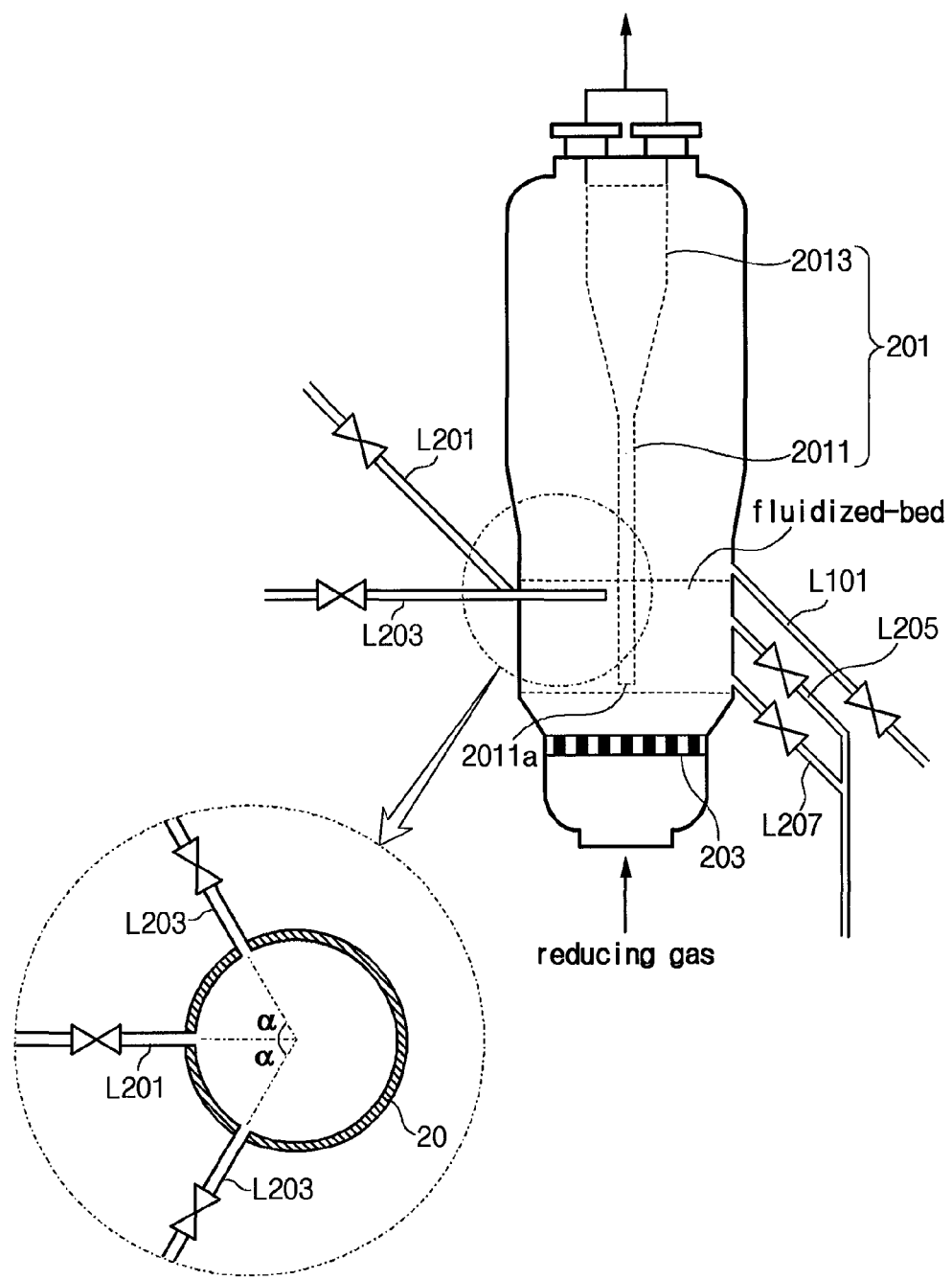
FIG. 2 is an enlarged schematic view of a third fluidized-bed reduction reactor of FIG. 1.

FIG. 2 illustrates an enlarged view of the second fluidized-bed reduction reactor 20 illustrated in FIG. 1. Although only the second fluidized-bed reduction reactor 20 is illustrated in FIG. 2, a structure of the second fluidized-bed reduction reactor 20 can be equally adapted to the above-described fluidized-bed reduction reactors 40, 30, and 10. In addition, the structure of the second fluidized-bed reduction reactor 20 illustrated in FIG. 2 is merely to illustrate the present invention and the present invention is not limited thereto. Therefore, the structure of the second fluidized-bed reduction reactor 20 can be modified into other forms.

A cyclone 201 and a distribution plate 203 are installed in the second fluidized-bed reduction reactor 20. As indicated by an arrow, the reducing gas is injected from a lower portion of the second fluidized-bed reduction reactor 20 and is then discharged toward an upper portion thereof. The injected reducing gas is uniformly distributed over an upper portion of the distribution plate of the second fluidized-bed reduction reactor 20 while passing through the distribution plate 203. The fluidized bed of the charged fine iron ore is formed by uniformly distributed reducing gas. The fine iron dust is scattered toward an upper portion of the cyclone 201 with a discharging gas including fine iron dust. The discharging gas is discharged outside. The fine iron dust is collected in the cyclone 201 and then discharged toward a lower portion of the cyclone 201. The cyclone 201 includes a cone portion 2013 collecting fine iron dust and a dipleg portion 2011 discharging fine iron dust collected in the cone portion 2013 toward a lower portion of the cyclone 201.

Two fine iron ore charging lines L201 and L203 are installed in the second fluidized-bed reduction reactor 20. Charging valves are installed in the fine iron ore charging lines L201 and L203 and thereby control a charging amount of the fine iron ore. Both the fine iron ore charging lines L201 and L203 extend in a gravity direction. Therefore, fine iron ore can be charged into the second fluidized-bed reduction reactor 20 from the third fluidized-bed reduction reactor 30 (shown in FIG. 1) by gravity. Two fine iron ore charging lines L201 and L203 are connected to the second fluidized-bed reduction reactor 20 at substantially the same height. Therefore, the fine iron ore is concentrated to be charged at the same height and thereby the sealing heights of the discharging passage of the fine iron ore charging lines are the same.

The magnified circle of FIG. 2 schematically illustrates a plan structure of the second fluidized-bed reduction reactor 20 seen from above. As illustrated in the magnified circle of FIG. 2, a plurality of fine iron ore charging lines L203 can be installed. For example, FIG. 2 illustrates a state in which two fine iron ore charging lines L203 are installed at either side of the fine iron ore charging line L201. In this case, the fine iron ore charging lines L203 are connected to the second fluidized-bed reduction reactor 20 toward a center thereof with the fine iron ore charging line L201 at a predetermined angle α therebetween. Therefore, the fine iron ore is concentrated to be charged through the fine iron ore charging lines L201 ad L203, and is uniformly distributed, thereby preventing the reducing gas from not flowing uniformly. In particular, the angle α may be in a range from 30 degrees to 150 degrees. If the angle α is less than 30 degrees, the fine iron ore is concentrated and a non-fluidized bed may be formed. In addition, if the angle α is greater than 150 degrees, the fine iron ore is quickly discharged toward the fine iron ore charging line L101 and reduces a stagnating time in the fluidized bed, thereby a reduction reaction does not sufficiently occur.

Fine iron ore charged into the second fluidized-bed reduction reactor 20 can be charged into the first fluidized-bed reduction reactor 10 (shown in FIG. 1) through another fine iron ore charging line L101. Charging valves are installed in the fine iron ore charging line L101 to control a flow of the fine iron ore. Meanwhile, the first and second fine iron ore discharging lines L205 and L207 are connected to the second fluidized-bed reduction reactor 20 at a lower portion of the fine iron ore charging line L101. The first fine iron ore discharging line L205 is a main fine iron ore discharging line into which the fine iron ore is mainly charged. The discharging valves are installed in the fine iron ore discharging lines L205 and L207, thereby controlling discharging amount of the fine iron ore.

Two fine iron ore discharging lines L205 and L207 are installed to prevent the fluidized bed from overfilling when the height of the fluidized bed increases during operation. Namely, when the fluidized-bed is becoming overfilled, the fine iron ore is discharged outside through the two fine iron ore discharging lines L205 and L207, and thereby preventing the fluidized bed from being overfilled.

The first fine iron ore discharging line L205 is connected to the second fluidized-bed reduction reactor 20 at a middle or upper portion of the fluidized bed. Therefore, if the fluidized bed is overfilled, the fine iron ore can be smoothly discharged. In this case, since a flow direction of the fine iron ore is the same as that of the reducing gas, impact on the fluidized bed can be minimized while the height of the fluidized bed can be controlled.

As illustrated in FIG. 2, the first fine ore discharging line L205 can be connected to the second fluidized-bed reduction reactor 20 at a position such that the first fine ore discharging line L205 is higher than a lower end 2011a of the dipleg portion 2011 and lower than the fine iron ore charging line L101. At this location, the first fine iron ore discharging line L205 can discharge fine iron ore outside not by force but naturally.

The second fine iron ore discharging line L207 is installed to be directly on the distribution plate 203. The second fine iron ore discharging line L207 discharges fine reduced iron by force by using a pressure difference with the quencher (not shown) connected to a lower portion thereof when the fluidized bed is overfilled or is empty. Since the first and second fine iron ore discharging lines L205 and L207 are connected to each other, they can be used at the same time.

Figure 3:
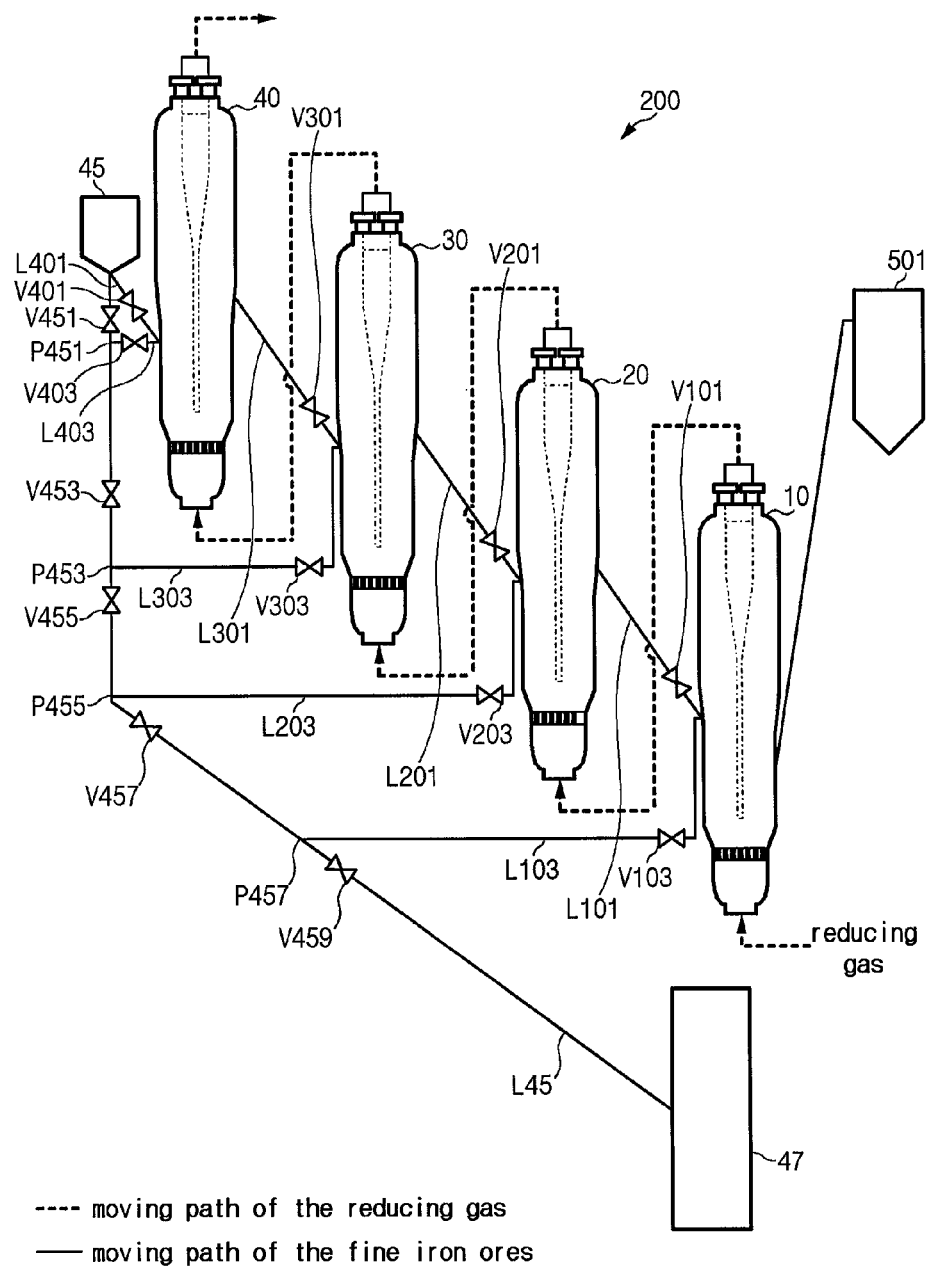
FIG. 3 is a schematic view of the fluidized-bed reduction reactor of FIG. 1.

FIG. 3 illustrates an enlarged state of a fine iron ore charging structure of the fluidized-bed reduction reactor 200 illustrated in FIG. 1. In FIG. 3, only a portion related to charging of the fine iron ore is illustrated and the remaining portions are is omitted for convenience. In FIG. 3, the solid line indicates a movement path of the reducing gas and the thin line indicates a movement path of the fine iron ore. The cyclone located in the fluidized-bed reduction reactor is indicated by the dotted line for convenience. The fine iron ore supplied from the fine iron ore charging bin 45 and passed through each of the fluidized-bed reduction reactors 40, 30, 20, and 10 and is manufactured into the reduced iron and is then stored in the reduced iron charging hopper 501. As illustrated in FIG. 3, the fluidized-bed reduction reactor 200 can only be provided with the fine iron ore charging device without a fine iron ore discharging device illustrated in FIG. 5.

The fine iron ore charging line illustrated in FIG. 3 includes first fine iron ore charging lines L401, L301, L201, and L101, and second fine iron ore charging lines L45, L403, L303, L203, and L103. The first fine iron ore charging lines L45, L403, L303, L203, and L103 include a sub-fine iron ore charging line L45 and branched fine iron ore charging lines L403, L303, L203, and L103. The sub-fine iron ore charging line L45 connects the fine iron ore charging bin 45 to the quencher 47. The branched fine iron ore charging lines L403, L303, L203, and L103 are branched from the sub-fine iron ore charging line L45 and are then connected to each of the fluidized-bed reduction reactors 40, 30, 20, and 10.

Therefore, the fine iron ore charging bin 45 and each of the fluidized-bed reduction reactors 40, 30, 20, and 10 are directly connected to each other through the second fine iron ore charging lines L45, L403, L303, L203, and L103. Therefore, the fine iron ore is not charged without continuously passing through the fluidized-bed reduction reactors but is directly charged into each of the fluidized-bed reduction reactors 40, 30, 20, and 10 from the fine iron ore charging bin 45 during an emergency situation, for example when an apparatus for manufacturing molten iron starts to operate or stops. As a result, the fluidized bed is quickly formed in each of the fluidized-bed reduction reactors 40, 30, 20, and 10, and thereby a dipleg portion of the cyclone is sealed in a short time. Hence, a backflow phenomenon of the reducing gas through the dipleg portion is minimized and the cyclone is prevented from being blocked.

Meanwhile, fine iron ore can be charged together not only by using the first fine iron ore charging lines L401, L301, L201, and L101 but also by using the second fine iron ore charging lines L45, L403, L303, L203, and L103. Therefore, since fine iron ore is charged in both directions, a fluidized bed can be more quickly formed in each of the fluidized-bed reduction reactors 40, 30, 20, and 10. The first fine iron ore charging line L401 connects the fine iron ore charging bin 45 to the fourth fluidized-bed reduction reactor 40 that is most adjacent thereto. In addition, the first fine iron ore charging lines L301, L201, and L101 connect the fluidized-bed reduction reactors 40, 30, 20, and 10 that neighbor each other. The valves V401, V301, V201, and V101 are installed in each of the first fine iron ore charging lines L401, L301, L201, and L101 such that the flow of the fine iron ore can be controlled.

A plurality of junctions P451, P453, P455, and P457 are formed where the sub-fine iron ore charging line L45 meets the branched fine iron ore charging lines L403, L303, L203, and L103. The charging valves V453, V455, and V457 are installed between each of the neighboring junctions P451, P453, P455, and P457, thereby controlling the flow of the fine iron ore. A ball valve can be used as a charging valve. In addition, the charging valve V451 can be installed between the fine iron ore charging bin 45 and the junction P451 adjacent thereto. The charging valve V459 can be installed between the quencher 47 and the junction P457 adjacent thereto, thereby controlling the flow of the fine iron ore.

In FIG. 3, as described above, although a plurality of charging valves are installed, this is merely to illustrate the present invention and the present invention is not limited thereto. Therefore, some charging valves can be omitted.

Meanwhile, the charging valves V403, V303, V203, and V103 are installed in each of the branched fine iron ore charging lines L403, L303, L203, and L103, thereby controlling flow of the fine iron ore that are charged into each of the fluidized-bed reduction reactors 40, 30, 20, and 10. When the fine iron ore charging bin 45 should be quickly evacuated when the fluidized-bed reduction reactors 40, 30, 20, and 10 are out of order and the fine iron ore cannot be charged, the charging valves V451, V453, V455, and V457 are opened and the rest of the valves are closed, and thereby the fine iron ore can be discharged to the quencher 47 from the fine iron ore charging bin 45.

In normal operation, the fine iron ore is charged into the fourth fluidized-bed reduction reactor 40 from the fine iron ore charging bin 45. When the fluidized bed is formed in the fourth fluidized-bed reduction reactor 40 and the fluidized bed gradually rises up to the height where the fine iron ore charging line L301 is connected, the fine iron ore is charged into the third fluidized-bed reduction reactor 30 and the fluidized bed is gradually formed therein by periodically opening and closing the fine iron ore charging valve V301. If the height of the fluidized bed in the third fluidized-bed reduction reactor 30 increases, and the lower portion 2011a (shown in FIG. 2) of the dipleg portion 2011 and an end portion of the fine iron ore charging line L301 are both sealed by the fluidized bed, the fine iron ore charging valve V303 is opened and then fine iron ore naturally overflows through the fine iron ore charging line L301 by opening the fine iron ore charging valve V303 and the fine iron ore is continuously charged into the fluidized-bed reduction reactor 30. The fluidized bed is formed in the first and second fluidized-bed reduction reactors 20 and 10 by using the above method, and then fine iron ore continuously flows from the fine iron ore charging bin 45 to the first fluidized-bed reduction reactor 10. A charging state of the fine iron ore during an emergency situation such that normal operation is difficult will be explained below.

Figure 4:
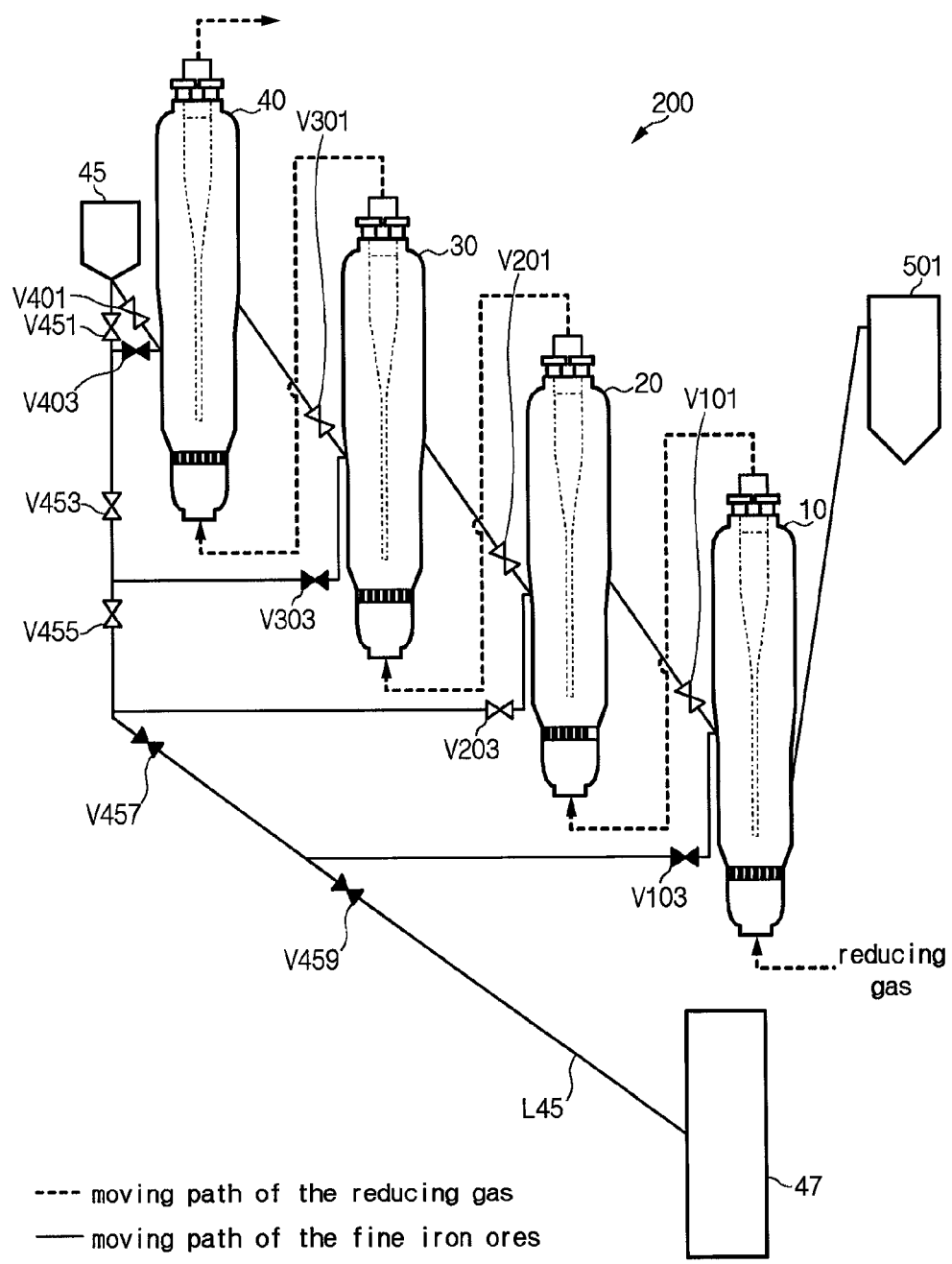
FIG. 4 is a view illustrating a state in which the fine iron ore is charged into the fluidized-bed reduction reactor of FIG. 1.

FIG. 4 illustrates a state in which fine iron ore is directly charged into only the second fluidized-bed reduction reactor 20 by using the fine iron ore charging device illustrated in FIG. 3. Although fine iron ore is illustrated to be only charged into the second fluidized-bed reduction reactor 20 in FIG. 4, this is merely to illustrate the present invention where fine iron ore is only supplied to a predetermined fluidized-bed reduction reactor, and the present invention is not limited thereto. Therefore, the fine iron ore can be directly charged into only one of the fourth fluidized-bed reduction reactor 40, the third fluidized-bed reduction reactor 30, the second fluidized-bed reduction reactor, and the first fluidized-bed reduction reactor 10.

For example, if the ore does not smoothly flow from the third fluidized-bed reduction reactor 30 to the second fluidized-bed reduction reactor 20, the fine iron ore can only be charged into the second fluidized-bed reduction reactor 20 by opening the charging valves V451, V453, V455, and V203, which are only related to a direct charge of the fine iron ore of the second fluidized-bed reduction reactor 20. In addition, the rest of the charging valves V403, V303, V103, V457, and 459 are closed, thereby preventing fine iron ore from directly being charged into the rest of the fluidized-bed reduction reactors 40, 30, and 10. When the fluidized bed should be formed only in the second fluidized-bed reduction reactor 20, the fine iron ore is directly charged into the second fluidized-bed reduction reactor 20 by using the above method, and thereby the operation can be stably carried out.

In particular, since the above method is necessary to quickly form the fluidized bed during operation, the charging valves V401, V301, V201, and V101 connecting each of the fluidized-bed reduction reactors 40, 30, 20, and 10 can be opened. However, all the charging valves V401, V301, V201, and V101 can be closed as necessary.

Figure 5:
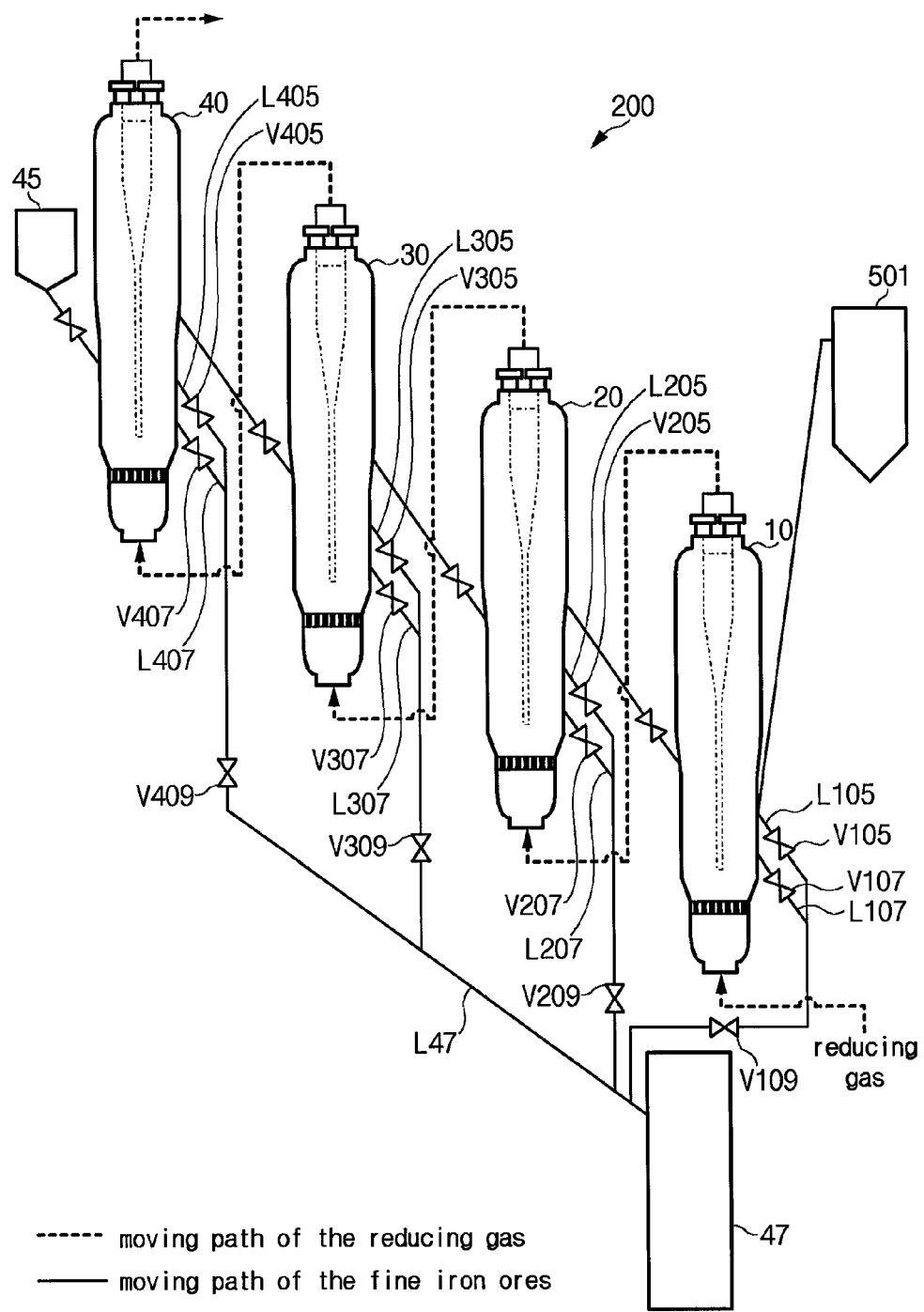
FIG. 5 is a schematic view of a modified fluidized-bed reduction reactor of FIG. 1.

FIG. 5 illustrates an enlarged view of the fine iron ore discharging structure of the fluidized-bed reduction reactor 200 illustrated in FIG. 1. Only a portion related to fine iron discharge from the fluidized-bed reduction reactor 200 is illustrated in FIG. 5 for convenience, and the remaining portions are omitted for convenience. The solid line illustrated in FIG. 5 indicates a moving path of the reducing gas, and the thin line indicates a moving path of the fine iron ore. As illustrated in FIG. 5, the fluidized-bed reduction reactor can be only provided with the fine iron ore discharging device without a fine iron ore charging device illustrated in FIG. 3.

The fine iron ore discharging line illustrated in FIG. 5 includes first fine iron ore discharging lines L405, L305, L205, and L105 and second fine iron ore discharging line L407, L307, L207, and L107. The discharging valves V405, V305, V205, and V105 are installed in the first fine iron ore discharging lines L405, L305, L205, and L105, respectively, thereby discharging fine iron ore into the quencher 47 when the fluidized bed is overfilled. In addition, the discharging valves V407, V307, V207, and V107 are installed in the second fine iron ore discharging lines L407, L307, L207, and L107, respectively, thereby discharging fine iron ore into the quencher 47.

As illustrated in FIG. 5, the first fine iron ore discharging lines L405, L305, L205, and L105 and the second fine iron ore discharging lines L407, L307, L207, and L107 can be connected to each other. Other discharging valves V409, V309, V209, and V109 are installed in a lower portion thereof to be connected to the fine iron ore discharging line L47, thereby controlling flow of fine iron ore that is discharged to the quencher 47.

The fine iron ore can be discharged outside to control the height of the fluidized bed during a normal operation by only using the first fine iron ore discharging lines L405, L305, L205, and L105. In this case, little impact is applied to the fluidized bed and the fluidized bed is controlled to be lowered to a suitable height. Meanwhile, when it is necessary to evacuate each inner portion of the fluidized-bed reduction reactors 40, 30, 20, and 10 such as for a stopping operation, the fluidized-bed reduction reactors 40, 30, 20, and 10 can be quickly evacuated by using both the first fine iron ore discharging lines L405, L305, L205, and L105 and the second fine iron ore discharging lines L407, L307, L207, and L107.

When the fine iron ore discharging device illustrated in FIG. 5 is used, differentiation and a sticking phenomenon caused by stagnation over a long time in the fluidized-bed reduction reactor 200 can be prevented by discharging the fine iron ore. In addition, a stagnating layer formed in the second fine iron ore discharging line L407, L307, L207, and L107 and near a connecting portion of the fluidized-bed reduction reactor are early prevented, and thereby the operating state of the fluidized-bed reduction reactor can be optimally maintained.

Figure 6:
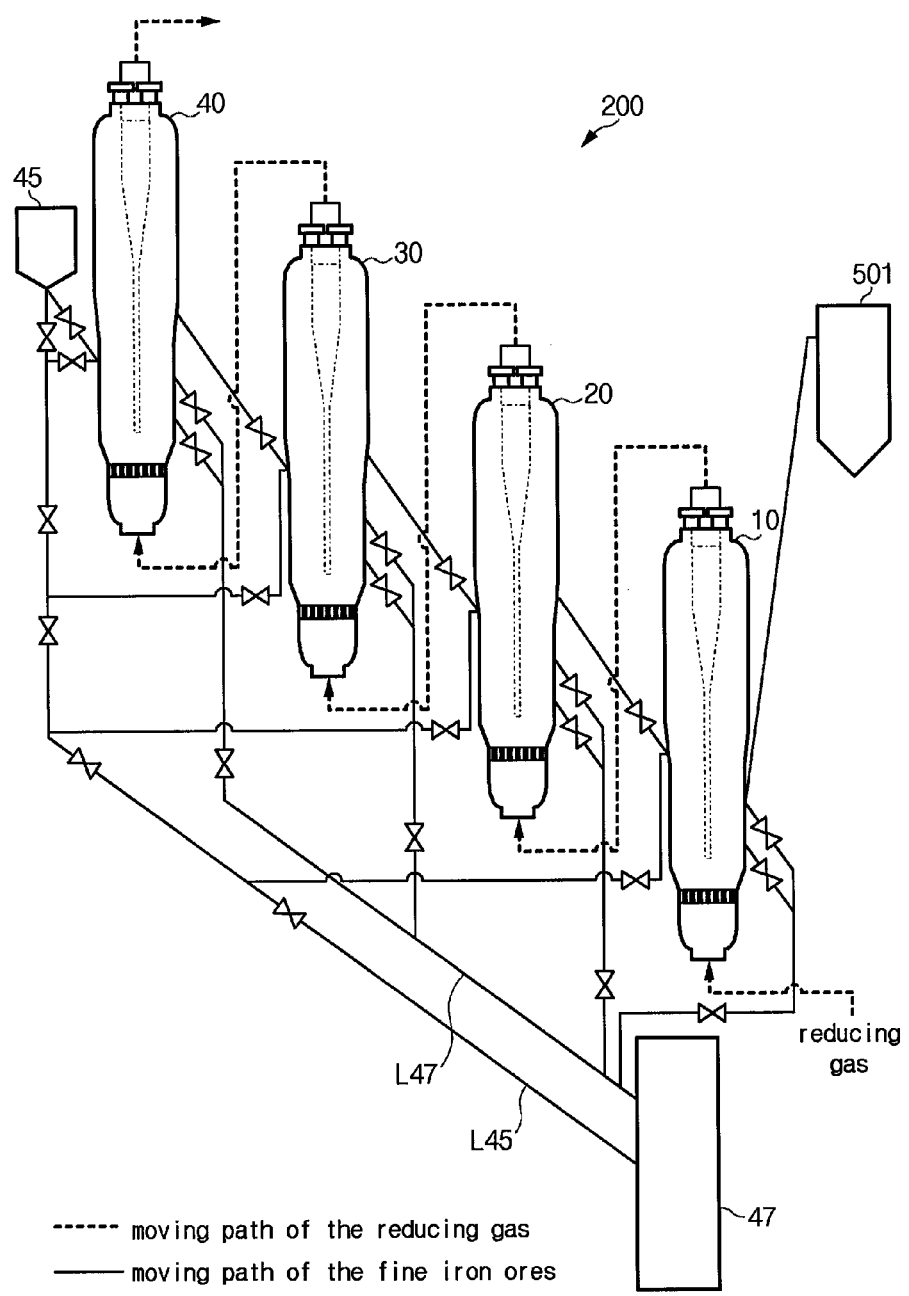
FIG. 6 is another schematic view of a modified fluidized-bed reduction reactor of FIG. 1.

FIG. 6 schematically illustrates a fluidized-bed reduction reactor 200 including a charging device of FIG. 3 and a discharging device of FIG. 5. Since the charging device of the fluidized-bed reduction reactor 200 illustrated in FIG. 6 is the same as that illustrated in FIG. 3, and a discharging device of the fluidized-bed reduction reactor 200 illustrated in FIG. 6 is the same as that illustrated in FIG. 5, a detailed explanation thereof is omitted. The quencher 47 is connected to both the second fine iron ore charging line L45 and the fine iron ore discharging line L44.

As illustrated in FIG. 6, fine iron ore can be charged or discharged by installing the charging device and the discharging device together. Therefore, when the fine iron ore are charged or discharged, stability of operation is maximized and operation of the fluidized-bed reduction reactor can be smoothly carried out.

The present invention is explained below through experimental examples of the present invention. The experimental examples of the present invention are merely to illustrate the present invention and the present invention is not limited thereto.

EXPERIMENTAL EXAMPLES

The experiments were carried out by using an apparatus for manufacturing molten iron having the above structure of FIG. 6. A supply pressure of the reducing gas was 3.0 bar and gas flux of a discharging gas was 160,000 Nm$^3$/hr. The temperature of the fourth fluidized-bed reduction reactor was maintained at 450° C., the third fluidized-bed reduction reactor was maintained at 650° C., the second fluidized-bed reduction reactor was maintained at 750° C., and the first fluidized-bed reduction reactor was maintained at 850° C. Since other experimental conditions can be easily understood by a person skilled in the art, a detailed description thereof is omitted.

Experimental Example 1

The fine iron ore was directly charged into each of the fluidized-bed reduction reactors from the fine iron ore charging bin by using the charging device illustrated in FIG. 6.

Experimental Example 2

The fine iron ore was discharged from each of the fluidized-bed reduction reactors to the quencher by using the discharging device illustrated in FIG. 6.

Comparative Example 1

The fine iron ore was charged into each of the fluidized-bed reduction reactors by using a conventional charging method of the fine iron ore for comparison with Exemplary Example 1. The fine iron ore sequentially passed through each of the fluidized-bed reduction reactors and was charged therein from the fine iron ore charging bin. Since a conventional discharging method of fine iron ore can be easily understood by the person skilled in the art, a detailed description thereof is omitted.

Comparative Example 2

The fine iron ore was discharged into each of the fluidized-bed reduction reactors by using a conventional discharging method of the fine iron ore for comparison with Exemplary Example 2. Since a conventional discharging method of fine iron ore can be easily understood by the person skilled in the art, a detailed description thereof is omitted.

Results of charging fine iron ore in the above described Experimental Example 1 and Comparative Example 1 are compared in Table 1 below.

TABLE 1

| Item | Experimental Example 1 | Comparative Example 1 |
| --- | --- | --- |
| Charging amount of fine iron ore (t/h) | 180 | 120 |
| Total filling time of a fluidized-bed reduction reactor (min.) | 155 | 240 |
| Sealing time of a dipleg portion in each of fluidized-bed reduction reactors (min) | 25/20/20/25 | 50/40/35/50 |
| Number of blockages of a cyclone during charging of 3 months (No) | 0 | 2 |

As described in Table 1, more fine iron ore could be charged in Experimental Example 1 of the present invention compared to Comparative Example 1 of the prior art. Therefore, time for filling the fine iron ore in the reactor was largely reduced and the fluidized beds were quickly formed in each of the fluidized-bed reduction reactors, thereby largely reducing time for sealing the dipleg portion. As described above, the dipleg portion was quickly sealed, and thereby no blockage phenomenon of the cyclone occurred during three months. Therefore, the operation could be stably maintained.

In addition, results of discharging fine iron ore in Experimental Example 2 and Comparative Example 2 that were compared to each other are shown in Table 1 below.

TABLE 2

| Item | Experimental Example 2 | Comparative Example 2 |
| --- | --- | --- |
| Pressure difference between the fluidized-bed reduction reactor and the quencher (bar) | 0.3~0.5 | 0.5~1.0 |
| Whether the stagnating is formed | did not occur | occurred near the discharging line |
| Malfunction frequency of the quencher pump (No./month) | 0 | 1 |
| Number of overfilling (No.) | 0 | 2 |
| Operation period | 120 days | 60 days |

As described in Table 2, it is shown that a pressure difference between the fluidized-bed reduction reactor and the quencher was reduced in Exemplary Example 2 of the present invention compared to the conventional Comparative Example 2. This is caused by the natural discharge of the fine iron ore. As the fine iron ore is naturally discharged, a stagnating layer is not formed in the fine iron ore discharging line. In addition, the quencher pump did not malfunction and the quencher was not overfilled since the large load was not applied to the quencher of Experimental Example 2 of the present invention. Furthermore, a long operation time could be significantly extended to up to 120 days.

Although exemplary embodiments of the present invention have been described in detail hereinabove, it should be clearly understood that many variations and/or modifications of the basic inventive concept taught herein still fall within the spirit and scope of the present invention, as defined by the appended claims and their equivalents.

The invention claimed is:

1. An apparatus for manufacturing molten iron, the apparatus comprising:
    at least one fluidized-bed reduction reactor that reduces fine iron ore and converts the fine iron ore into reduced iron;
    a fine iron ore charging bin that supplies the fine iron ore to the fluidized-bed reduction reactor;
    a fine iron ore charging line that directly connects the fine iron ore charging bin to the at least one fluidized-bed reduction reactor, and directly charges the fine iron ore into the at least one fluidized-bed reduction reactor;
    a melter-gasifier into which lumped carbonaceous materials and the reduced iron are charged and oxygen is injected, the melter-gasifier manufacturing molten iron; and
    a reducing gas supply line that supplies a reducing gas discharged from the melter-gasifier to the fluidized-bed reduction reactor,
    wherein the fine iron ore charging line comprises:
    a sub-fine iron ore charging line that is connected to the fine iron ore charging bin; and
    a branch fine iron ore charging line that is branched from the sub-fine iron ore charging line and is connected to each of the fluidized-bed reduction reactor.

2. The apparatus of claim 1, further comprising a quencher that is connected to the fine iron ore charging bin through the sub-fine iron ore charging line.

3. The apparatus of claim 2, wherein a plurality of junctions are formed where the sub-fine iron ore charging line meets the branch fine iron ore charging line, and a charging valve is installed between neighboring junctions, between the fine iron ore charging bin and the junction that is most adjacent thereto, and between the quencher and the junction that is most adjacent thereto.

4. The apparatus of claim 1, wherein a charging valve is installed in the branch fine iron ore charging line.

5. The apparatus of claim 1, further comprising a main fine iron ore charging line that connects the fine iron ore charging bin to the fluidized-bed reduction reactor that is most adjacent to the fluidized-bed reduction reactor and connects neighboring fluidized-bed reduction reactors to each other.

6. The apparatus of claim 5, wherein a sub-fine iron ore charging line is connected to the fluidized-bed reduction reactor at a height that is the same as the height where the main fine iron ore charging line is connected to the fluidized-bed reduction reactor.

7. The apparatus of claim 6, wherein the sub-fine iron ore charging line that is connected to the fluidized-bed reduction reactor makes a predetermined angle with the main fine iron ore charging line where the main fine iron ore charging line is connected to the fluidized-bed reduction reactor.

8. The apparatus of claim 7, wherein the predetermined angle is in a range from 30 degrees to 150 degrees.

9. An apparatus for manufacturing molten iron, the apparatus comprising:
    at least one fluidized-bed reduction reactor in which a fluidized bed is formed, the fluidized-bed reduction reactor reducing fine iron ore and converting the fine iron ore into reduced iron;
    a fine iron ore discharging line that connects to the at least one fluidized-bed reduction reactor at a middle or an upper portion of the fluidized bed and discharges fine iron ore from the fluidized-bed reduction reactor;
    a melter-gasifier into which lumped carbonaceous materials and the reduced iron are charged and oxygen is injected, the melter-gasifier manufacturing molten iron;
    a reducing gas supply line that supplies a reducing gas discharged from the melter-gasifier to the fluidized-bed reduction reactor; and
    a quencher that is connected to each of the fluidized-bed reduction reactors through the fine iron ore discharging line.

10. The apparatus of claim 9, further comprising another fine iron ore discharging line that is directly installed on a distribution plate in each of the fluidized-bed reduction reactors, and
    wherein the fine iron ore discharging line is connected to the other fine iron ore discharging line.

11. The apparatus of claim 10, further comprising a fine iron ore charging line that connects the fluidized-bed reduction reactors to each other and discharges the fine iron ore, and
    wherein the fine iron ore discharging line is connected to each of the fluidized-bed reduction reactors at a location where the fine iron ore discharging line is higher than a lower end of a dipleg portion of a cyclone installed in each of the fluidized-bed reduction reactors and is lower than the fine iron ore charging line.

12. An apparatus for manufacturing molten iron, the apparatus comprising:
    at least one fluidized-bed reduction reactor in which a fluidized bed is formed, the fluidized-bed reduction reactor reducing fine iron ore and converting the fine iron ore into reduced iron;
    a fine iron ore charging bin that supplies fine iron ore to the fluidized-bed reduction reactor;
    a fine iron ore charging line that directly connects the charging bin to the at least one fluidized-bed reduction reactor, and directly charges the fine iron ore into the at least one fluidized-bed reduction reactor;
    a fine iron ore discharging line that is connected to the at least one fluidized-bed reduction reactor at a middle or an upper portion of the fluidized bed and discharges fine iron ore from the at least one fluidized-bed reduction reactor;
    a melter-gasifier into which lumped carbonaceous materials and the reduced iron are charged and oxygen is injected, the melter-gasifier manufacturing molten iron;
    a reducing gas supply line that supplies a reducing gas discharged from the melter-gasifier to the fluidized-bed reduction reactor; and
    a quencher that is connected to the fine iron ore charging line and the fine iron ore discharging line.

* * * * *